United States Patent Office 2,804,443
Patented Aug. 27, 1957

2,804,443
MODIFIED POLYSTYRENE COMPOSITIONS

James William Lynn Fordham, Hazardville, Conn., assignor to Monsanto Chemical Company, St. Louis, Mo., a corporation of Delaware No Drawing. Application July 14, 1954,
Serial No. 443,421

12 Claims. (Cl. 260—45.5)

This invention relates to modified resinous polystyrene compositions. More particularly, this invention relates to a process for improving the physical properties of polystyrene and to the products obtained thereby.

It has been proposed to blend polyisobutylene with polystyrene in order to improve the physical properties thereof. Although some improvement has been obtained, there has been much to be desired, particularly with respect to toughness.

Accordingly, an object of the present invention is the provision of polystyrene compositions having improved physical properties.

Another object is the provision of toughened polystyrene compositions.

A further object is the provision of a process for improving the physical properties of polystyrene.

These and other objects are attained by polymerizing styrene having dissolved therein an oxidized isobutylene polymer having a combined oxygen pick-up of about 0.2–2%, based on the original weight of the polymer.

The following examples are given in illustration and are not intended as limitations on the scope of this invention. Where parts are mentioned, they are parts by weight.

Example I

Heat a solid, particulate copolymer of 98% isobutylene with 2% isoprene at a temperature of about 100° C. for 20 hours while passing a stream of oxygen therethrough. At the end of this time the copolymer will have picked up about 0.8% oxygen, based on the original weight of the copolymer, such oxygen being chemically combined with the copolymer. Dissolve 5 parts of the oxidized copolymer in 95 parts of monomeric styrene and heat the resultant solution at a temperature of about 95° C. for about 15 hours. At the end of this time substantially all of the styrene has polymerized and there is obtained a solid composition comprising polystyrene and the oxidized copolymer. When samples of this composition are tested for impact strength in accordance with A. S. T. M. test No. 256–47T, they are found to have an average impact strength of about 0.35 ft. lbs./inch of notch.

Equally satisfactory results are obtained when the isobutylene-isoprene copolymer is replaced by a solid homopolymer of isobutylene and Example I is otherwise repeated in the above-described manner. Satisfactory results are also obtained when the oxidized isobutylene-isoprene copolymer of Example I is replaced by other oxidized isobutylene copolymers, such as an oxidized copolymer of about 75% isobutylene with 25% styrene or an oxidized copolymer of about 80% isobutylene with about 20% butadiene, such oxidized copolymers having an oxygen pick-up of about 1%. The modified polystyrene compositions that are obtained in the above manner have improved toughness as compared with similar compositions prepared from non-oxidized isobutylene polymers or oxidized isobutylene polymers having an oxygen pick-up of less than about 0.2%. This is shown by Example II.

Example II

Heat a solid, particulate copolymer of 98% isobutylene with 2% isoprene at a temperature of about 100° C. for about 5 hours while passing a stream of oxygen therethrough. At the end of this time the oxidized copolymer will have picked up about 0.1% of oxygen, based on the original weight of the copolymer. Dissolve 5 parts of the oxidized copolymer in 95 parts of monomeric styrene and heat the resultant solution at a temperature of about 95° C. for about 15 hours. At the end of this time substantially all of the styrene has polymerized. When samples of this composition are tested for impact strength in accordance with A. S. T. M. test No. 256–47T, they are found to have an average impact strength of about 0.25 ft. lbs./inch of notch.

When 5 parts of a non-oxidized copolymer of 98% isobutylene with 2% isoprene is dissolved in 95 parts of monomeric styrene and the styrene is then polymerized in the manner described above in Example II in the presence of about 0.01 part of di-tertiary butyl peroxide, there is obtained a composition having an impact strength of only about 0.20 ft. lbs./inch of notch.

From the foregoing it is seen that the composition of Example I had an impact strength that was 75% greater than the impact strength of the composition prepared from the non-oxidized copolymer whereas the impact strength of the composition of Example II was increased by only about 25%.

The improved products of the present invention are obtained by polymerizing styrene in the presence of a solid oxidized isobutylene polymer, such oxidized polymer having a chemically combined oxygen pick-up of about 0.2–2%, based on the original weight of the polymer. Conventional processes such as a mass, suspension, etc. polymerization process may be used in polymerizing the styrene. It is not necessary to use a polymerization catalyst although a small amount of a suitable polymerization catalyst such as di-tertiary butyl peroxide, benzoyl peroxide, etc. may be used if desired. If the oxidized isobutylene polymer is incorporated into styrene that has already been polymerized, an improvement in physical properties is not obtainable and, in fact, the physical properties of the polystyrene will normally be impaired.

As has been indicated, the oxidized isobutylene polymers to be dissolved in monomeric styrene in accordance with the present invention are solid homopolymers of isobutylene or copolymers containing about 40–99% isobutylene. Illustrative of the copolymers that may be used are copolymers of isobutylene with ethylenically unsaturated monomers copolymerizable therewith, such as conjugated dienes, illustrative of which are butadiene, 1,3-dimethyl butadiene, isoprene, chloroprene, etc.; monovinyl and monovinylidene aromatic compounds including styrene, alpha methyl styrene, 2,4-dichlorostyrene, vinyl naphthalene, etc. Two or more such comonomers may be used if desired. In accordance with a preferred form of the invention, the isobutylene polymer is either a homopolymer of isobutylene or a copolymer of about 95–99% isobutylene with correspondingly, about 5–1% isoprene. The isobutylene polymers and copolymers may be prepared by low temperature polymerization in the presence of an ionic polymerization catalyst.

The isobutylene polymers may be oxidized by various known methods. However, this is most easily accomplished by heating the polymer in the presence of oxygen at a temperature of about 50–100° C. until the desired pick-up of combined oxygen (i. e. 0.2–2%) has been obtained. Preferably, a stream of oxygen is passed through the polymer during the heating period. The desired oxygen pick-up is normally obtained with about 10–100 hours of heating.

The ratio of oxidized isobutylene polymer to styrene may be varied within comparatively wide limits so that, for example, 5–99 parts of styrene may be polymerized in the presence of, correspondingly, about 95–1 parts of oxidized isobutylene polymer. However, for many applications, such as the preparation of packaging materials, electrical insulation materials, etc., it is preferable to use about 40–80 parts of oxidized isobutylene polymer for each 100 parts of styrene. Molding compositions are preferably obtained by polymerizing 100 parts of styrene in the presence of about 1–10% of oxidized isobutylene polymer.

If desired, there may be incorporated into the compositions of the present invention other additives such as lubricants, stabilizers, plasticizers, dyes, pigments, fillers, mold-release agents, etc.

What is claimed is:

1. A toughened polymeric composition prepared by polymerizing styrene having dissolved therein a solid oxidized isobutylene polymer, said oxidized polymer having a combined oxygen pick-up of about 0.2–2%, based on the original weight of the polymer which is a member of the group consisting of homopolymers of isobutylene and copolymers of about 40–99% isobutylene with, correspondingly, about 60–1% of an ethylenically unsaturated compound copolymerizable therewith.

2. A composition as in claim 1 prepared by polymerizing 100 parts by weight of styrene having dissolved therein about 40–80 parts by weight of oxidized isobutylene polymer.

3. A composition as in claim 1 prepared by polymerizing 100 parts by weight of styrene having dissolved therein about 1–10 parts by weight of oxidized isobutylene polymer.

4. A composition as in claim 3 wherein the oxidized polymer is a homopolymer of isobutylene.

5. A composition as in claim 3 wherein the oxidized polymer is a copolymer of isobutylene.

6. A composition as in claim 5 wherein the copolymer is a copolymer of about 95–99% isobutylene with, correspondingly, about 5–1% isoprene.

7. A process which comprises the steps of dissolving a solid oxidized polymer of isobutylene in monomeric styrene and then polymerizing the styrene, said oxidized polymer having a combined oxygen pick-up of about 0.2–2%, based on the original weight of the polymer which is a member of the group consisting of homopolymers of isobutylene and copolymers of about 40–99% isobutylene with, correspondingly, about 60–1% of an ethylenically unsaturated compound copolymerizable therewith.

8. A process as in claim 7 wherein about 40–80 parts of oxidized isobutylene polymer are dissolved in 100 parts of monomeric styrene.

9. A process as in claim 7 wherein about 1–10 parts of oxidized isobutylene polymer are dissolved in 100 parts of monomeric styrene.

10. A process as in claim 9 wherein the oxidized polymer is a homopolymer of isobutylene.

11. A process as in claim 9 wherein the oxidized polymer is a copolymer of isobutylene.

12. A process as in claim 11 wherein the copolymer is a copolymer of 95–99% isobutylene with, correspondingly, 5–1% isoprene.

References Cited in the file of this patent

UNITED STATES PATENTS

| | | |
|---|---|---|
| 2,282,002 | Scott et al. | May 5, 1942 |
| 2,320,924 | Gift | June 1, 1943 |
| 2,461,966 | Davis | Feb. 15, 1949 |
| 2,610,962 | Smyers et al. | Sept. 16, 1952 |